June 2, 1970   J. B. NIMS, JR   3,515,638
FUEL SYSTEMS FOR NUCLEAR REACTORS
Filed May 12, 1967   2 Sheets-Sheet 1

INVENTOR.
JOHN B. NIMS, JR.
BY
*Ward, Haselton, McClannon, Brooks & Fitzpatrick*
ATTORNEYS

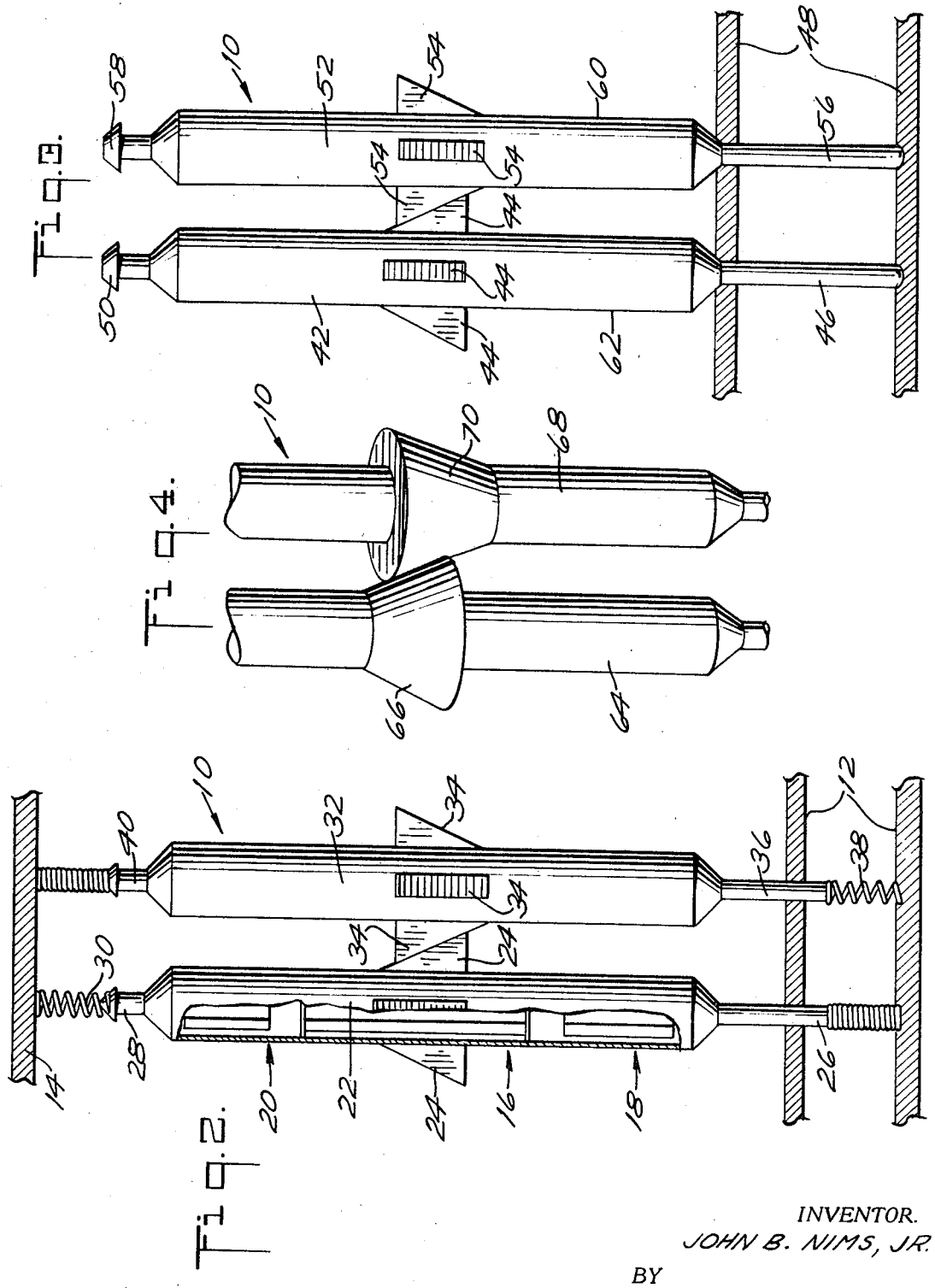

United States Patent Office 3,515,638
Patented June 2, 1970

3,515,638
FUEL SYSTEMS FOR NUCLEAR REACTORS
John B. Nims, Jr., Royal Oak, Mich., assignor to Atomic Power Development Associates, Inc., Detroit, Mich., a corporation of New York
Filed May 12, 1967, Ser. No. 638,098
Int. Cl. G21c 19/02
U.S. Cl. 176—28                    6 Claims

ABSTRACT OF THE DISCLOSURE

A nuclear reactor comprising an array of fuel sub-assemblies having tapered cooperating interface surfaces, whereby longitudinal expansion of the sub-assembly causes radial core expansion.

---

This invention relates to nuclear reactors, and, more particularly, to fuel elements for nuclear reactors and means for mounting and controlling same.

It will be appreciated that fundamentally a nuclear reactor will operate in a safe manner under normal conditions. Like all mechanical devices, reactors are also susceptible to component malfunctions which in some instances can lead to overheating and considerable damage. A nuclear reactor may have a certain amount of resistance to excess temperature. This resistance is usually referred to as negative reactivity feedback. This is a mechanism or combination of mechanisms by which the reactor will respond to increasing temperatures in such a way as to reduce the power level and the temperatures. It may happen that in a particular reactor design, the reactivity feedback is not as large as desired to provide natural inherent protection. It is an aim of the present invention to provide for increasing the negative feedback and thereby greatly improving the safety of the reactor.

My invention contemplates the provision of a construction wherein a plurality of fuel sub-assemblies are provided having tapered interface surfaces, whereby the longitudinal expansion of the sub-assemblies causes radial core expansion. The structure provides a magnification of the core radial expansion, thermal and power coefficients by several times or more, as desired, and hence, provides a strong negative coefficient, thereby greatly improving the safety characteristics of the reactor. In a conventional tight core design, the radial expansion of the core is determined by the radial thermal expansion of the fuel assemblies at the contact plane. According to my invention, the contact surfaces are inclined or tapered planes instead of parallel planes and neighboring or adjacent sub-assemblies are adapted for differential vertical movement so that when the sub-assemblies expand longitudinally as a result of the temperature rise, adjacent sub-assemblies will move vertically with respect to each other along their inclined surfaces in a direction that will cause outward displacement thereof. The magnitude of the displacement can be varied by varying the angle of the inclined surfaces.

In one form of the invention a first fuel assembly having a protruding contact surface in the form of an inclined plane is employed. Means are provided for supporting the plane for movement in a first vertical direction. Also provided is a second fuel assembly disposed adjacent the first fuel assembly. This assembly has a protruding contact surface in the form of a mating inclined plane with respect to the first inclined plane. Means are employed for supporting the second fuel assembly for movement in a second opposite vertical direction with respect to the first fuel assembly. The means for supporting the first fuel assembly may comprise means for fixedly mounting the lower end thereof and means, such as a spring in the handling head for resiliently mounting the upper end thereof; and the means for supporting the second fuel assembly may comprise means for fixedly mounting the upper end thereof, and means, such as a spring in the inlet nozzle, for resiliently mounting the lower end thereof. This allows the first assembly to move upwardly and the second assembly to move downwardly as a result of the thermal expansion, thereby providing differential vertical movement and radial displacement.

As another aspect of my invention, the protruding contact surfaces may be substantially shorter in length than the length of the fuel assemblies and the contact surfaces may be centrally disposed with respect to the fuel assemblies.

In another form of this invention, the first fuel assembly has a protruding contact surface in the form of an inclined plane, and the second fuel assembly is disposed adjacent thereto, the second assembly having a protruding contact surface in the form of an inclined plane which is a mating plane with respect to the first inclined plane. The walls or cladding of the second fuel assembly are fabricated from a different material having a different coefficient of thermal expansion than the walls of the first fuel assembly so that when the temperature rises, differential vertical movement of the assemblies occurs, and the interaction of the inclined planes causes outward displacement of the fuel assemblies, thereby providing a stronger negative reactivity feedback for improving control and protection against reactor excursion. The foregoing structure may further include a support member upon which the same ends of both fuel assemblies are fixedly mounted.

As still another aspect of the invention, the walls of the first fuel assembly may be fabricated from a material having a coefficient of thermal expansion of less than about $2 \times 10^{-6}/°$ C., and wherein the walls of the second fuel assembly may be fabricated from steel. Also, according to the invention, the walls of the first fuel assembly may be fabricated from a material selected from the group consisting of Invar, an iron alloy, a nickel alloy, and a cobalt alloy; and the walls of the second fuel assembly may be fabricated from steel. These metals have different thermal expansion properties, and hence, are suitable for providing the necessary differential vertical movement of the fuel assemblies.

My concept contributes an exceedingly simple and effective fuel assembly that serves to strengthen the total feedback in order to provide greater protection against accidental reactivity insertions in designs wherein the feedback is not as strong as desired. It also provides the needed inherent response for flow failure accidents in core designs wherein the normal feedback effects are insufficient. The new and improved fuel assembly according to my concept is particularly desirable for use with oxide cores or other ceramic fueled reactors, it being noted that in flow failure accidents in ceramic cores the Doppler coefficient actually works to oppose shut-down and has to be overcome by other negative feedback effects.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention in order to prevent the appropriation of my invention by those skilled in the art.

Several preferred embodiments of the invention have been chosen for purposes of illustration and description and are shown in the accompanying drawings, forming a part of the specification wherein:

FIG. 2 is a side elevation, partially in section, showing the interrelationship of two fuel assemblies as mounted in a nuclear reactor;

FIG. 3 is a side elevation of a second embodiment of the invention; and

FIG. 4 is a fragmentary perspective view showing another form of the invention.

Figure 1:
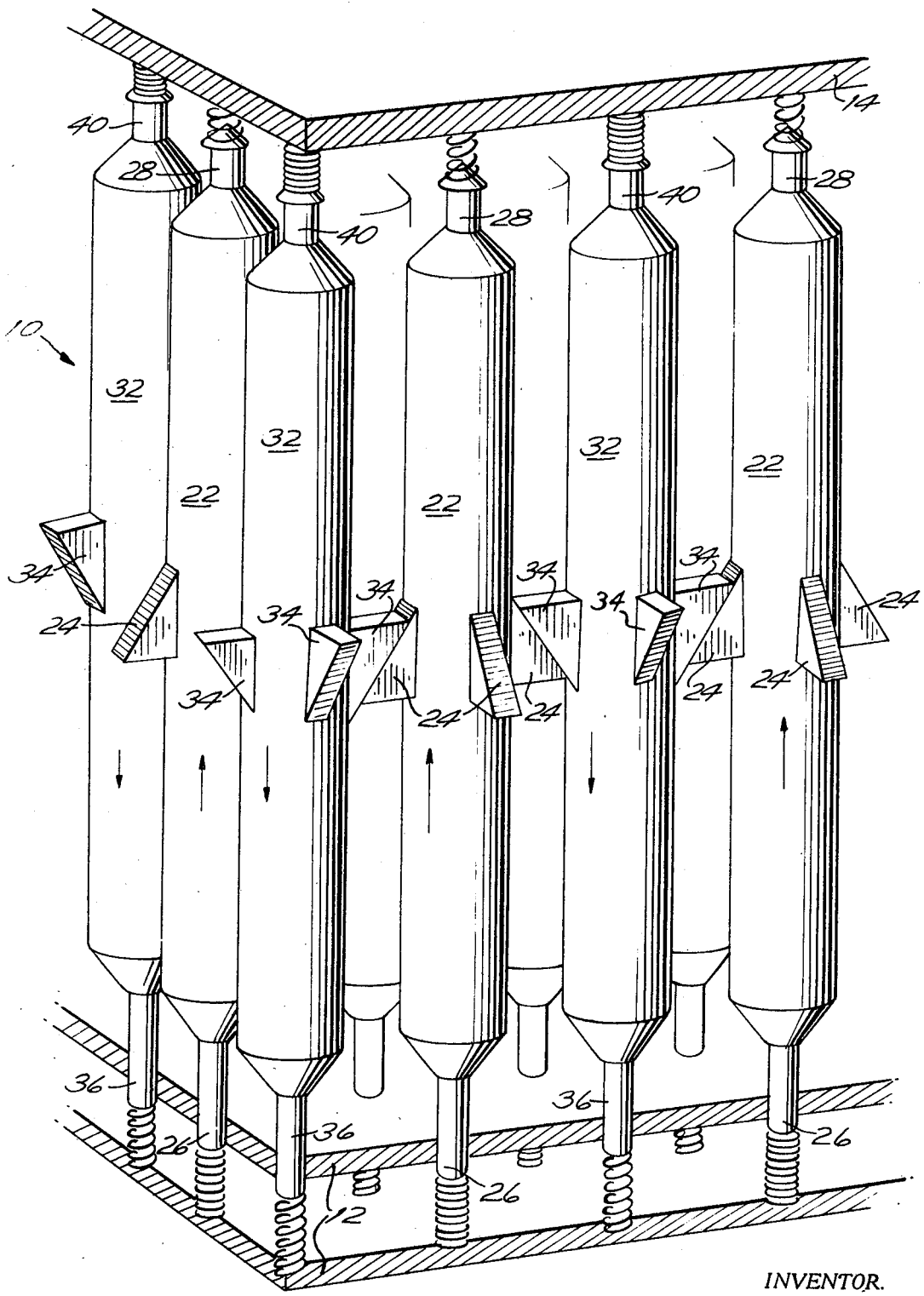
FIG. 1 is a perspective view showing a plurality of fuel assemblies supported in relative relation, one with respect to the other, in accordance with the concept of this invention.

In the embodiment of the invention illustrated in FIGS. 1 and 2, the fuel assemblies, indicated generally at 10, are mounted between support plates 12 and top hold down plate 14. As best seen in FIG. 2, each fuel assembly contains a central core portion indicated generally at 16, a lower blanket or reflector portion indicated generally at 18, and an upper blanket or reflector portion indicated generally at 20.

The fuel assemblies are divided into two groups. Each fuel assembly 22 of the first group is provided with protruding contact surfaces in the form of four inclined contact planes 24 which are spaced 90° apart one with respect to the next. These planes extend downwardly and outwardly at an angle of the order of about 30° with respect to the axis of the fuel assembly. The bottom or nozzle 26 of the fuel assembly 22 is incompressible and the top or head 28 is compressible, as by means of spring 30, so that when the fuel assembly expands longitudinally as a result of the temperature rise during operation, the assembly including the inclined contact planes 24 will move vertically upwardly.

Each fuel assembly 32 in the second group is provided with contact surfaces in the form of four inclined contact planes 34 which are also spaced 90° apart one with respect to the next. These planes extend downwardly and inwardly forming a mating inclined plane with respect to the first inclined plane 24. The bottom or nozzle 36 of the fuel assembly 32 is compressible as by means of spring 38 and the top or head 40 is incompressible so that when the fuel assembly expands longitudinally as a result of the temperature rise, the assembly, including the inclined contact planes 34 will move vertically downwardly. Hence, it will be appreciated that the first fuel assembly 22 moves vertically upwardly and the second adjacent fuel assembly 32 moves vertically downwardly as a result of the expansion, thereby providing differential vertical movement and due to the interaction of the contact planes 24 and 34, the fuel assemblies are radially displaced a distance proportional to the angles of the planes, thereby providing a strong negative reactivity feedback.

In the embodiment of the invention illustrated in FIG. 3, there is shown a first fuel assembly 42 provided with protruding contact surfaces in the form or four inclined contact planes 44 (only three being shown) which are spaced 90° apart, one with respect to the next. These planes extend downwardly and outwardly at an angle of the order of about 30° with respect to the axis of the fuel assembly. The bottom or nozzle 46 of the fuel assembly 46 is mounted on the support plates 48 and the top or head 50 thereof is left free for movement. A second fuel assembly 52 is provided with protruding contact surfaces in the form of four inclined contact planes 54 (only three being shown) which are spaced 90° apart one with respect to the next. These planes extend downwardly and inwardly forming a mating inclined plane with respect to the first inclined plane 44. The bottom or nozzle 56 of the fuel assembly 52 is fixedly mounted on the support plate 48 adjacent the fuel assembly 42 and the top or head 58 is left free for movement. The wall or cladding 60 is fabricated from a different material having a different coefficient of thermal expansion than the wall 62 of the first fuel assembly 42 so that when the temperature rises, differential vertical movement of the assemblies occur, and the interaction of the contact planes 44 and 54 causes outward displacement of the fuel assemblies, thereby providing an automatic strong negative reactivity feedback.

It will be appreciated that the walls 60 may be fabricated from a material having a coefficient of thermal expansion of less than about $2 \times 10^{-6}/°$ C. and wherein the walls 62 may be fabricated from steel. Also, the walls 60 may be fabricated from a material selected from the group consisting of Invar, iron alloy, nickel alloy, and cobalt alloy; and the walls 62 may be fabricated from steel.

Referring next to FIG. 4 there is shown another embodiment of my invention wherein a first fuel element 64 is provided with a protruding contact surface in the form of a frustum of a cone 66 with downwardly, outwardly sloping walls. The second fuel element 68 is provided with a protruding contact surface in the form of a frustum of a cone 70 with downwardly, outwardly sloping walls forming a mating contact surface with respect to cone 66. The cones 66 and 70 interact in the same manner as that described hereinbefore in connection with inclined contact planes 24 and 34 (FIG. 2) as well as 44 and 54 (FIG. 3). Differential vertical movement of the fuel assemblies 64 and 68 may be provided in the same manner as that described hereinbefore in connection with the fuel assemblies 22 and 32 (FIG. 2) or as that described in connection with fuel assemblies 52 and 42 (FIG. 3). Accordingly, in operation fuel assemblies 64 and 68 move outwardly in magnified proportions to their longitudinal movement.

From the foregoing description it will be seen that the present invention contributes a new and improved array of fuel elements for nuclear reactors which provides an automatic strong negative reactivity feedback.

Although certain particular embodiments of the invention are herein disclosed for purposes of explanation, further modifications thereof, after study of this specification, will be apparent to those skilled in the art to which the invention pertains. Reference accordingly should be had to the appended claims in determining the scope of the invention.

What is claimed and desired to be secured by Letters Patent is:

1. In a nuclear recator the combination comprising a first fuel assembly having a conically shaped protruding contact surface with a downwardly increasing diameter, a second fuel assembly disposed adjacent said first fuel assembly and having a mating conically shaped protruding contact surface with an upwardly increasing diameter, the walls of said second fuel assembly being fabricated from a different material having a different coefficient of thermal expansion from the walls of the first fuel assembly, whereby longitudinal expansion of said subassemblies causes radial core expansion, thereby providing self-compensating reactivity feedback.

2. In a nuclear reactor the combination comprising a first fuel assembly having a protruding contact surface in the form of an inclined plane, a second fuel assembly disposed adjacent said first fuel assembly and having a contact surface in the form of a mating inclined plane with respect to the first inclined plane, the walls of said second fuel assembly being fabricated from a different material having a different coefficient of thermal expansion than the walls of the first fuel assembly, whereby longitudinal expansion of said subassemblies causes radial core expansion, thereby providing self-compensating reactivity feedback.

3. A nuclear reactor according to claim 2, further comprising a support member for said fuel assemblies, and wherein the same ends of each of said fuel assemblies are fixedly mounted on said support member.

4. A nuclear reactor according to claim 2, wherein the walls of said first fuel assembly are fabricated from the material selected from the group consisting of iron alloy, nickel alloy and cobalt alloy; and wherein the walls of said second fuel assembly are fabricated from steel.

5. A nuclear reactor according to claim 2, wherein the walls of said first fuel assembly are fabricated from a material having a coefficient of thermal expansion less than about $2 \times 10^{-6}/^\circ$ C., and wherein the walls of said second assembly are fabricated from steel.

6. A nuclear reactor according to claim 2, wherein said inclined planes on each of said fuel assemblies are four inclined planes spaced substantially 90° apart one with respect to the next adjacent one.

References Cited

UNITED STATES PATENTS

| | | | |
|---|---|---|---|
| 2,994,657 | 8/1961 | Petrick | 176—54 |
| 3,070,531 | 12/1962 | Huet | 176—28 |
| 3,147,191 | 9/1964 | Crowther | 176—55 |
| 3,324,008 | 6/1967 | Howieson et al. | 176—76 |
| 3,338,791 | 8/1967 | Lass et al. | 176—76 |

FOREIGN PATENTS 1,237,542  6/1960  France.

BENJAMIN R. PADGETT, Primary Examiner

H. E. BEHREND, Assistant Examiner

U.S. Cl. X.R.

176—76, 78